US010906494B1

(12) United States Patent
Chan et al.

(10) Patent No.: US 10,906,494 B1
(45) Date of Patent: Feb. 2, 2021

(54) SYSTEMS AND METHODS FOR PREDICTING OCCUPANT LOCATION BASED ON VEHICULAR COLLISION

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 320 days.

(21) Appl. No.: 15/873,335

(22) Filed: Jan. 17, 2018

Related U.S. Application Data

(60) Provisional application No. 62/448,223, filed on Jan. 19, 2017.

(51) Int. Cl.
| | |
|---|---|
| *G06F 7/00* | (2006.01) |
| *B60R 21/015* | (2006.01) |
| *B60R 21/0136* | (2006.01) |
| *B60N 2/00* | (2006.01) |
| *B60R 21/00* | (2006.01) |
| *B60R 21/013* | (2006.01) |

(52) U.S. Cl.
CPC .......... *B60R 21/0156* (2014.10); *B60N 2/002* (2013.01); *B60R 21/0136* (2013.01); *B60R 21/01538* (2014.10); *B60R 21/01542* (2014.10); *B60R 21/01544* (2014.10); *B60R 21/01562* (2014.10); *B60R 2021/0027* (2013.01); *B60R 2021/01315* (2013.01)

(58) Field of Classification Search
CPC .......... B60R 21/0156; B60R 21/01544; B60R 21/0136; B60R 21/01542; B60R 21/01538; B60R 21/01562; B60R 2021/01315; B60R 2021/0027; B60N 2/002
See application file for complete search history.

(56) References Cited

U.S. PATENT DOCUMENTS

| 4,966,388 | A | * | 10/1990 | Warner | ............... B60R 21/0136 |
|---|---|---|---|---|---|
| | | | | | 280/730.1 |
| 5,419,088 | A | * | 5/1995 | Raymond | .................. B60J 1/08 |
| | | | | | 52/1 |

(Continued)

*Primary Examiner* — Khoi H Tran
*Assistant Examiner* — Jorge O Peche
(74) *Attorney, Agent, or Firm* — Marshall, Gerstein & Borun LLP

(57) ABSTRACT

A computer-implemented method is provided for predicting occupant location based on vehicular collision. The method includes receiving, at a computing system including one or more processors, information indicative of a vehicle crash involving a vehicle occupant. The method also includes receiving, at the computing system, information indicative of a position of the vehicle occupant within the vehicle prior to the vehicle crash. The method also includes determining, by the one or more processors, a probability of ejection of the vehicle occupant according to (i) the information indicative of the vehicle crash and (ii) the position of vehicle occupant. The method also includes providing, by the computing system, the probability of ejection of the vehicle occupant to one or more emergency responders.

8 Claims, 7 Drawing Sheets

(56) References Cited

U.S. PATENT DOCUMENTS

| | | | | |
|---|---|---|---|---|
| 5,486,019 | A * | 1/1996 | Chevroulet | B60R 21/164 280/730.1 |
| 5,553,924 | A * | 9/1996 | Cantor | B60N 2/002 297/452.27 |
| 5,602,734 | A * | 2/1997 | Kithil | B60N 2/002 180/282 |
| 5,802,479 | A * | 9/1998 | Kithil | B60N 2/002 257/295 |
| 6,149,194 | A * | 11/2000 | Breed | B60R 21/235 280/729 |
| 6,179,326 | B1 * | 1/2001 | Breed | B60R 21/20 280/730.1 |
| 6,484,369 | B1 * | 11/2002 | Conaway | B60R 21/09 24/163 R |
| 6,517,110 | B1 * | 2/2003 | Butters | B60R 21/201 280/730.2 |
| 7,178,827 | B2 * | 2/2007 | Wu | B60R 21/08 280/730.2 |
| 9,969,344 | B1 * | 5/2018 | Kolasiski | G08B 25/016 |
| 10,388,084 | B1 * | 8/2019 | Chan | G07C 5/0808 |
| 2001/0015548 | A1 * | 8/2001 | Breed | B60N 2/0276 280/735 |
| 2001/0035634 | A1 * | 11/2001 | Breed | B60R 21/235 280/730.2 |
| 2001/0048215 | A1 * | 12/2001 | Breed | B60N 2/0232 280/728.1 |
| 2002/0027346 | A1 * | 3/2002 | Breed | B60N 2/0276 280/735 |
| 2002/0079679 | A1 * | 6/2002 | Thiele | B60R 21/33 280/735 |
| 2002/0101067 | A1 * | 8/2002 | Breed | B60R 21/233 280/741 |
| 2003/0122669 | A1 * | 7/2003 | Filippov | B60R 21/01532 340/563 |
| 2003/0127842 | A1 * | 7/2003 | Pywell | B60R 21/08 280/753 |
| 2004/0006427 | A1 * | 1/2004 | Stiller | G06T 7/593 701/300 |
| 2004/0256842 | A1 * | 12/2004 | Breed | B60R 21/231 280/730.1 |
| 2005/0133291 | A1 * | 6/2005 | McCoy | B60R 22/30 180/268 |
| 2005/0184492 | A1 * | 8/2005 | Shilliday | B60R 21/232 280/730.2 |
| 2006/0113757 | A1 * | 6/2006 | Romeo | B60R 21/08 280/730.1 |
| 2007/0228703 | A1 * | 10/2007 | Breed | B60R 21/206 280/735 |
| 2008/0018140 | A1 * | 1/2008 | Reutter | B60R 21/0134 296/221 |
| 2008/0125940 | A1 * | 5/2008 | Breed | B60R 21/013 701/45 |
| 2009/0014990 | A1 * | 1/2009 | Loibl | B60R 21/233 280/730.2 |
| 2009/0212537 | A1 * | 8/2009 | Slaats | B60R 21/232 280/728.2 |
| 2011/0126991 | A1 * | 6/2011 | Murphy | B60J 1/20 160/91 |
| 2011/0254330 | A1 * | 10/2011 | Lich | B60N 2/4279 297/216.1 |
| 2011/0272928 | A1 * | 11/2011 | Czach | B60R 21/232 280/730.2 |
| 2012/0025502 | A1 * | 2/2012 | Matsushita | B60R 21/214 280/730.2 |
| 2013/0099470 | A1 * | 4/2013 | Wipasuramonton | B60R 21/26 280/742 |
| 2013/0134694 | A1 * | 5/2013 | Matsushita | B60R 21/232 280/729 |
| 2013/0168950 | A1 * | 7/2013 | Nakamura | B60R 21/233 280/728.2 |
| 2015/0054265 | A1 * | 2/2015 | Deng | B60R 21/239 280/730.2 |
| 2016/0001732 | A1 * | 1/2016 | Asada | B60R 21/233 280/729 |
| 2016/0229366 | A1 * | 8/2016 | Witt | B60R 21/06 |
| 2017/0144774 | A1 * | 5/2017 | Pollard | B64D 11/062 |
| 2017/0151925 | A1 * | 6/2017 | Kim | B60R 21/213 |
| 2017/0240131 | A1 * | 8/2017 | Low | B60R 21/233 |
| 2018/0050652 | A1 * | 2/2018 | Jung | B60R 21/232 |
| 2018/0194307 | A1 * | 7/2018 | Han | B60N 2/56 |
| 2019/0016292 | A1 * | 1/2019 | Son | B60R 21/262 |
| 2019/0193666 | A1 * | 6/2019 | Jost | B60R 21/231 |

* cited by examiner

SYSTEMS AND METHODS FOR PREDICTING OCCUPANT LOCATION BASED ON VEHICULAR COLLISION

CROSS-REFERENCE TO RELATED APPLICATION

This application claims the benefit of U.S. Provisional Patent Application No. 62/448,223, entitled "Systems And Methods For Predicting Occupant Location Based On Vehicular Collision," filed on Jan. 19, 2017, the disclosure of which is hereby incorporated herein by reference.

FIELD

The present disclosure is directed to detecting and analyzing parameters associated with vehicle collisions. More particularly, the present disclosure is directed to systems and methods for providing vehicle ejection information to one or more emergency responders.

BACKGROUND

Today, vehicle collisions may be identified by drivers, passengers, and witnesses who see or are involved in the collision. However, such collisions may not be identified and reported in real-time, because the drivers, passengers, and witnesses involved in the collision may be incapacitated or unwilling to report the collision. Moreover, an assessment of vehicle ejection may not be known until one or more emergency responders arrive at the scene of the collision.

SUMMARY

In one aspect, a computer-implemented method is disclosed. The method includes receiving, at a computing system including one or more processors, information indicative of vehicle contact involving an occupant. The method also includes receiving, at the computing system, information indicative of a position of the occupant within the vehicle prior to the vehicle contact. The method also includes determining, by the one or more processors, a probability of ejection of the occupant according to (i) the information indicative of the vehicle contact and (ii) the position of the occupant. The method also includes providing, by the computing system, the probability of ejection of the occupant to one or more emergency responders.

In another aspect, a system is disclosed. The system includes one or more computing devices. The system also includes a non-transitory computer-readable memory coupled to the one or more computing devices and storing thereon instructions. The instructions, when executed by the one or more computing devices, cause the one or more computing devices to receive information indicative of a change in momentum associated with a vehicle. The information indicative of the change in momentum is based on data captured by one or more sensors of the vehicle. The instructions also cause the one or more computing devices to receive information indicative of damage to one or more glass panes of the vehicle. The information indicative of the damage is based on data captured by the one or more sensors of the vehicle. The instructions also cause the one or more computing devices to receive information indicative of a posture of an occupant of the vehicle prior to the change in momentum. The information indicative of the posture is based on data captured by one or more image sensors coupled to the vehicle. The instructions also cause the one or more computing devices to determine a probability of vehicle ejection of the occupant based on (i) the change in momentum, (ii) the damage to the one or more glass panes, and (iii) the posture of the occupant. The instructions also cause the one or more computing devices to provide an output signal that includes the probability of vehicle ejection to one or more emergency responders.

In another aspect, a computer-implemented method is disclosed. The method includes receiving, at a computing system including one or more processors, information indicative of a vehicle contact involving an occupant. The method also includes receiving, at the computing system, information indicative of a position of the occupant within the vehicle prior to the vehicle contact. The method also includes determining, by the one or more processors, a probability of ejection of the occupant according to (i) the information indicative of the vehicle contact and (ii) the position of the occupant. The method also includes based on the probability of ejection satisfying a threshold, determining, by the one or more processors, a location of the occupant subsequent to the change in momentum according to the information indicative of the vehicle contact. The method also includes providing, by the computing system, a visual notification that includes the location to the one or more emergency responders.

DETAILED DESCRIPTION

Figure 1A:
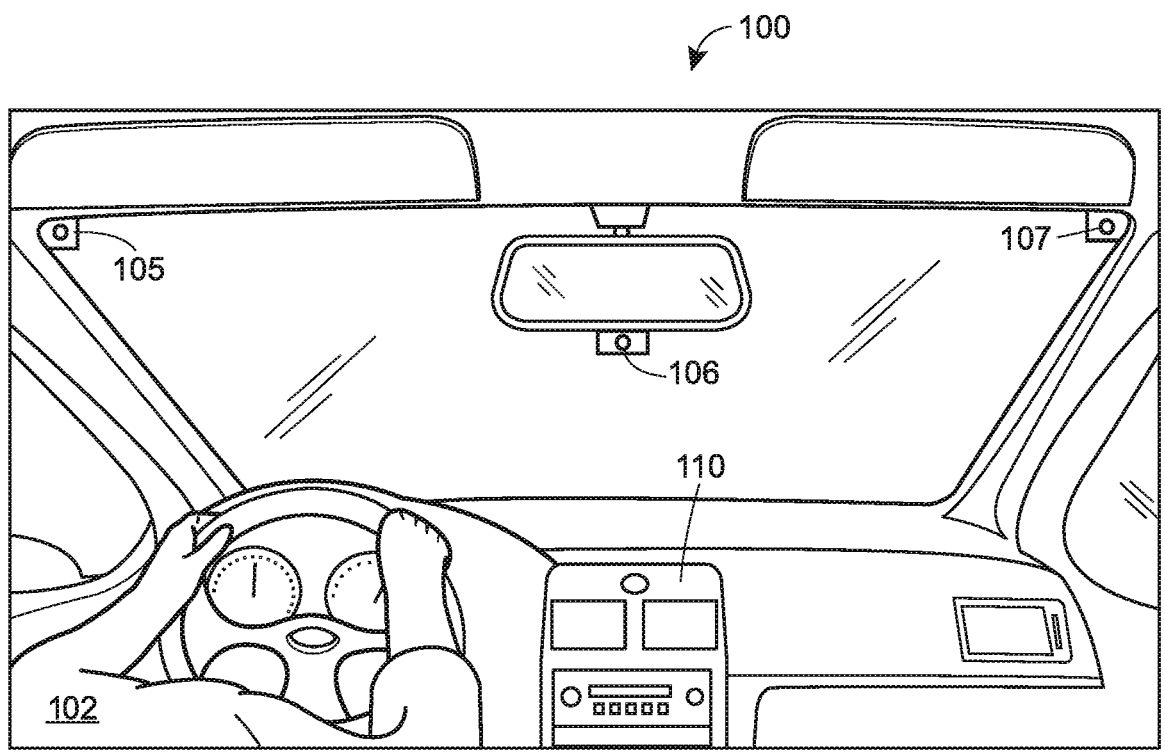
FIGS. 1A and 1B depict exemplary environments within a vehicle including various components configured to facilitate various functionalities, in accordance with some embodiments.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

The present embodiments may relate to, inter alia, detecting, recording, compiling, comparing, and analyzing vehicle data and vehicle occupant data. Existing vehicle operation environments support the generation of various vehicle data. However, there is no way to properly analyze the vehicle data with vehicle occupant data in a meaningful manner to determine a probability of vehicle ejection upon an unexpected vehicle contact. The vehicle contact may include a collision between the vehicle and other vehicle(s). The vehicle contact may also include a collision between the vehicle and one or more objects (e.g., a guard rail, buildings, trees, etc.). The present embodiments improve these shortcomings by analyzing the vehicle data and the vehicle occupant data for subsequent transmission of the analysis to one or more emergency providers.

In order to determine a probability of vehicle ejection, a system may be configured to receive vehicle data indicative of a vehicle crash (or "vehicle contact") involving a vehicle occupant. In some embodiments, the system may be integrated into the vehicle and receive the vehicle data in real-time (e.g., captured by one or more sensors of the vehicle). In other embodiments, the system may be located remotely from the vehicle.

In addition to receiving the vehicle data, the system may be configured to receive vehicle occupant information about one or more vehicle occupants in real-time. For example, the received vehicle occupant information (e.g., captured by one or more imaging sensors) may include a position of a vehicle occupant within the vehicle prior to the unexpected vehicle contact (e.g., a vehicular collision, a collision with a utility pole, etc.). In another example, the vehicle occupant information may also include a posture of the vehicle occupant prior to the vehicle contact.

The received vehicle data and the vehicle occupant information may be analyzed in order to determine a probability of ejection of the vehicle occupant upon determination of a vehicular collision. For example, the vehicle data may be analyzed to determine the locations of damaged glass panes of the vehicle. In this example, a relative location of the vehicle occupant to the damaged glass panes may be determined from the received vehicle occupant information. Further, the probability of ejection may be increased by a predetermined percentage (e.g., upon determination that damage occurred to the front windshield while the vehicle occupant was sitting in the front) or decreased by a predetermined percentage (e.g., upon determination that damage occurred to the rear windshield while the vehicle occupant was sitting in the front) based on the relative location of the vehicle occupant to the damaged glass panes.

The vehicle data may be analyzed to determine whether a sudden change to various metrics of the vehicle (e.g., speed, heading, acceleration, etc.) exceed one or more thresholds that could cause an ejection from the vehicle. The received vehicle occupant information may be analyzed to determine whether the posture (e.g., vehicle occupant reaching for something behind her) of the vehicle occupant prior to the crash would increase the likelihood of vehicle ejection. The system may also be configured to determine the probability of ejection according to additional vehicle occupant information such as whether the vehicle occupant was wearing a seatbelt prior to the crash.

In one example, the probability of vehicle ejection may be determined as "high" according to a significant change in one or more metrics of the vehicle (e.g., vehicle heading North at 50 miles per hour (mph) experiences an acceleration of 15 mph per second and changes heading from North to West) and a determined posture of the vehicle occupant (e.g., the vehicle occupant was not properly restrained by a seatbelt). In another example, the probability of vehicle ejection may be determined as "low" according to minimal change in one or more metrics of the vehicle (e.g., vehicle heading North and stopped experiences an acceleration of 1 mph per second) and a determined posture (e.g., vehicle occupant removing a jacket and therefore not properly restrained by a seatbelt) of the vehicle occupant.

Depending on the analysis of the vehicle data and the vehicle occupant information, the probability of ejection of the vehicle occupant may be provided to emergency responders as a visual notification (e.g., "high," "medium," "low," etc.) and displayed on one or more devices associated with the emergency responders. The probability may also be provided for display according to other indicators (e.g., one or more colors) or scoring schemes (e.g., a percentage, a score between 0 and 100, etc.) to reflect the likelihood of vehicle ejection. In another example, the probability of vehicle ejection may be transmitted to a central database that is accessible by emergency providers.

Vehicle contact may be associated with a change in momentum of the vehicle (and hence, a change in momentum of one or more occupants of the vehicle). Accordingly, in some embodiments, a change in momentum of the vehicle may be determined based at least in part upon information of vehicle contact (e.g., based upon vehicle accelerometer data indicative of vehicle velocity, and/or other sensor data) and/or based upon the mass of the vehicle. A determined change in momentum may be used, for example, to determine a probability of ejection of an occupant from the vehicle, an ejection trajectory of an ejected occupant, and/or an estimated location of the ejected occupant.

In some vehicle contact scenarios (e.g., multi-vehicle collisions), a change in momentum of a first vehicle may be dependent upon the momentum (i.e., speed and mass) of another one or more entities (e.g., other moving vehicles) in the collision. In some scenarios of other vehicles in a multi-vehicle collision may not be immediately known to the systems and methods described herein. In these scenarios, momentum of another entity in the collision may be estimated based upon the observed momentum of the first vehicle or estimated mass and/or speed of the other entity. Additionally or alternatively, momentum of the first vehicle and/or the other entity may be estimated based upon empirical data from similar vehicle contact scenarios.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, and 107. In the particular scenario depicted in FIG. 1A, each of the image sensors 105 and 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, and 107 may be disposed or located at various alternate or additional portions of the vehicle 100, including on an exterior of the vehicle 100.

Each of the image sensors 105, 106, and 107 may be configured to detect and convey information that constitutes an image. In particular, each of the image sensors 105, 106, and 107 may generate digital image data according to the detected information, where the digital image data may be in the form of two-dimensional (2-D) and/or three-dimensional (3-D) image data and/or video data. Although not depicted in FIG. 1A, the vehicle 100 may also include one or more audio sensors (e.g., microphones) that may be disposed in one or more locations, where the audio sensors may be configured to capture audio data that may supplement the digital image data captured by the image sensors 105, 106, and 107.

The vehicle 100 may include a system 110 configured with any combination of software and hardware components. In some implementations, the system 110 may be included as part of an on-board diagnostic (OBD) system or any other type of system configured to be installed in the vehicle 100, such as an original equipment manufacturer (OEM) system. The system 110 may include a set of sensors configured to detect and record various telematics data associated with the vehicle 100. In some implementations, the system 110 may be configured to communicate with (i.e., request, retrieve, or receive data from) a set of sensors disposed in other locations of the vehicle 100, such as each of the image sensors 105, 106, and 107.

According to embodiments, the set of sensors included in the system 110 or otherwise configured to communicate with the system 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the individual 102, including various biometric information, movements, and/or the like.

Figure 1B:
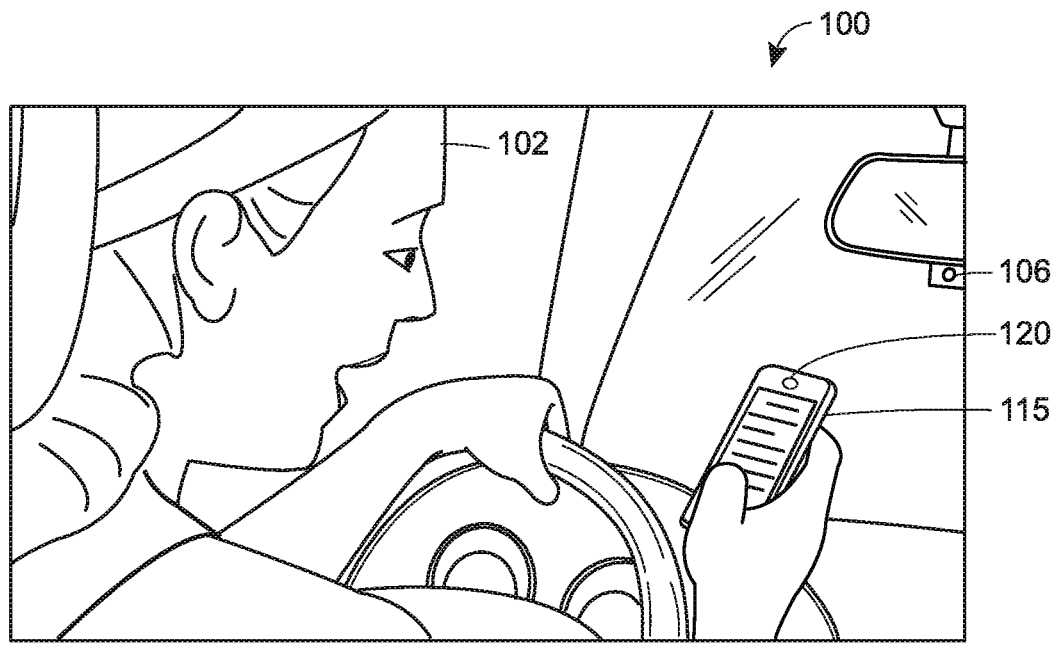

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, biometric, and/or other types of sensors.

In some implementations, the electronic device 115 may be configured to interface with additional components of the vehicle 100. In particular, the electronic device 115 may interface (e.g., communicate wirelessly) with the system 110 and sensors thereof, any of the image sensors 105, 106, and 107, and/or other components of the vehicle 100, such as any additional sensors that may be disposed within the vehicle 100. Further, although not depicted in FIG. 1A or 1B, the vehicle 100 and/or each of the system 110 and the electronic device 115 may be equipped with storage or memory capable of storing various data.

The system 110 and the electronic device 115 may further interface with the various sensors or other components to assess real-time operation data associated with the vehicle 100. For example, the real-time vehicle operation data may include any sensor data from the yaw rate sensor, the tilt sensor, the steering angle sensor, the brake sensor, and/or any other sensor. Further, the system 110 and the electronic device 115 may access supplemental movement data from additional sensors, such as the location module, the gyroscope, and/or the accelerometer of the electronic device 115. According to embodiments, the real-time vehicle operation data and/or the supplemental movement data may include or indicate a set of driving events corresponding to operation of the vehicle. The system 110 and the electronic device 115 may also access operator data from various sensors (including one or more of the image sensors 105, 106, and 107), where the operator data indicates various condition(s) (e.g., sitting in a reclined position, using a mobile device, etc.) or movement(s) (e.g., removing a seatbelt, reaching towards the front console, etc.) of the individual 102.

The system 110 and the electronic device 115 may additionally communicate with remote components via one or more network connections to retrieve additional information related to the environment of the vehicle 100. In particular, the system 110 and the electronic device 115 may retrieve operation parameters specific to a make and model of the vehicle 100. The system 110 and the electronic device 115 may analyze the vehicle operation data, the vehicle occupant data, and optionally the supplemental movement data and/or the operation parameters, to determine a probability of ejection of a vehicle occupant upon a crash involving the vehicle 100.

Further, the system 110 and the electronic device 115 may also communicate with a remote computing system (not shown) in order to provide information indicative of a vehicle crash involving a vehicle occupant and information indicative of the position of the vehicle occupant prior to the vehicle crash. According to embodiments, the remote computing system may be configured to determine the probability of ejection of the vehicle occupant according to the information indicative of the vehicle crash and the information indicative of the position of the vehicle occupant. Further, in some embodiments, the remote computing system may provide the determined probability of ejection of the vehicle occupant to one or more emergency responders.

Figure 2:
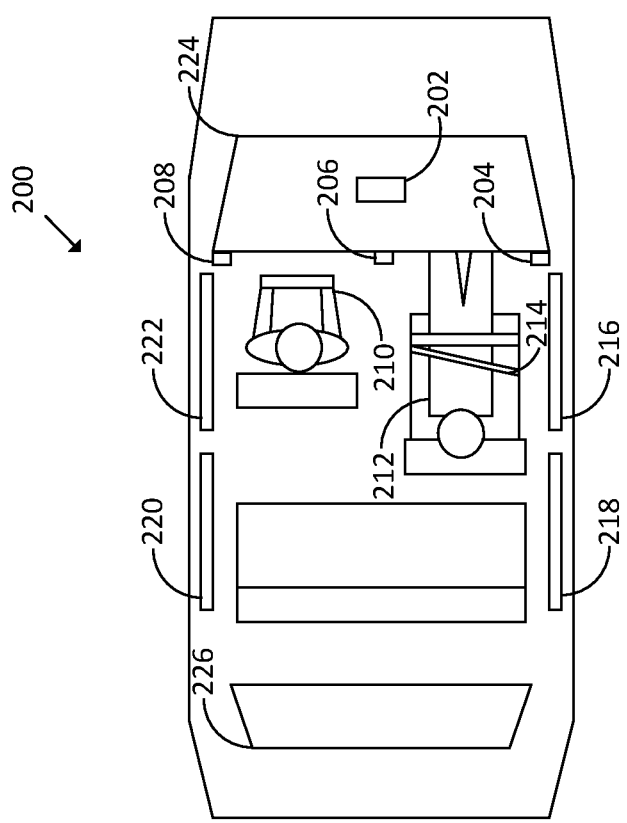
FIG. 2 depicts an example top view of a vehicle, in accordance with some embodiments.

FIG. 2 illustrates an example depiction of a top view of vehicle 200 that may include various components associated with the systems and methods. The vehicle 200 includes system 202 and a set of image sensors 204, 206, and 208 (that operate in a similar manner as discussed with the image sensors 105, 106, and 107 of FIG. 1A). The vehicle 200 also includes seatbelt 214, vehicle windows 216, 218, 220, and 222, front windshield 224 and rear windshield 226. FIG. 2 also includes individual 210 operating the vehicle 200 and individual 212 in a recumbent position.

In some embodiments, the system 202 may include one or more computing devices (not shown in FIG. 2) and a non-transitory computer-readable memory (not shown in FIG. 2) coupled to the one or more computing devices. The non-transitory computer-readable memory may be configured to store instructions that when executed by the one or more computing devices cause the one or more computing devices to receive information indicative of a change in momentum associated with the vehicle 200. The information indicative of the change in momentum is based on data captured by one or more sensors of the vehicle 200.

In one embodiment, an accelerometer (not shown in FIG. 2) coupled to the vehicle 200 may monitor and/or measure the acceleration of the vehicle 200 along several axes. For example, the acceleration of the vehicle 200 may be measured along the X, Y, and/or Z axes. In some embodiments, the accelerometer may be configured to provide a measured change in acceleration along any of the axes to the system 202 that could be associated with a vehicle collision. The system 202 may use the data captured by the accelerometer to determine a change in momentum of the vehicle 200.

In another embodiment, an audio sensor (not shown in FIG. 2) coupled to the vehicle 200 may be configured to detect whether one or more glass panes (e.g., vehicle windows 216, 218, 220, 222, front windshield 224, and rear windshield 226) are damaged as a result of a crash involving the vehicle 200. The audio sensor may provide captured data (e.g., a frequency and intensity of the sound) during the crash to the system 202. The system 202 may use the captured data by the audio sensor to determine the damage to the one or more glass panes.

In another embodiment, the set of image sensors 204, 206, and 208 may capture 2-D and/or 3-D image data of the individual 210 and the individual 212. The image sensors 204, 206, and 208 may provide the image data to the system 202 in a real-time basis. As depicted in FIG. 2, the image data corresponding to the individual 212 would indicate that the individual 212 was in a recumbent position within the vehicle 200 and therefore could be more prone to vehicle ejection.

In the event of a vehicular collision involving vehicle 200, the system 202 may be configured to determine a probability of vehicle ejection of either individual 210 or individual 212. The system 202 may be configured to determine the probability of vehicle ejection based on the change in momentum of the vehicle 200, the damage to one or more glass panes of the vehicle 200, and the posture of a vehicle occupant of the vehicle 200. Operation of the system 202 will be described in an example scenario involving a vehicular collision of vehicle 200 based on the positions of individual 212 and individual 210 as shown in FIG. 2.

In this example scenario, the system 202 may receive information indicative of a vehicle crash involving the vehicle 200 and individuals 210 and 212. The received information may include speed data, acceleration data, image data, and/or sound data collected by one or more sensors. In some embodiments, each type of sensor data may be collected at a different sampling rate. Each set of sensors may include an indication of whether the set of sensor data corresponds to a vehicle collision based on one or more correlations between the sets of sensor data.

The one or more computing devices of the system 202 may then receive each set of sensor data and perform an analysis on the sensor data. A set of rules for determining the probability of vehicle ejection may be used according to each set of sensor data. For example, for a given set of sensor data, a first set of rules may specify a threshold acceleration that must be satisfied in order for a possibility of vehicle ejection to occur. In one example, the first set of rules may specify to analyze the speed of the vehicle 200 and measured changes in acceleration of the vehicle 200 to determine the probability of vehicle ejection. According to the first set of rules, the one or more computing devices of system 202 may calculate a vehicle momentum score.

The one or more computing devices may use a second set of rules to determine whether one or more glass panes of the vehicle 200 have been damaged. In addition to analyzing the frequency and intensity associated with the audio data, the second set of rules may also include instructions for cross-referencing other sensor data. For example, the second set of rules may contain instructions to compare a timing associated with the audio data and a timing associated with a sudden change to the acceleration of the vehicle 200. In this example, based on the timing being within a threshold, the system 202 may adjust a respective score associated with the sensor data used to determine the probability of vehicle ejection. According to the second set of rules, the one or more computing devices of system 202 may be configured to calculate a vehicle glass damage score.

The one or more computing devices may use a third set of rules and a library of posture data to analyze the 2-D and/or 3-D image data captured by the set of image sensors 204, 206, and 208. In one implementation, the system 202 may retrieve the library of posture data from a remote server (not shown) via a network(s). In another implementation, the system 202 may retrieve the library of posture data locally stored on the memory of the system 202. In some embodiments, the library of posture data may include various risk levels of vehicle ejection that correspond to postures of vehicle occupants.

The one or more computing devices may compare the captured 2-D and/or 3-D image data with the library of posture data. In particular, the system 202 may analyze differences and similarities of characteristics of the captured 2-D and/or 3-D image data with the library of posture data to match the captured data to a given posture of the library of posture data. Further, the system 202 may use the match to determine a probability of vehicle ejection of the vehicle occupant. For example, if the system 202 determines that the individual 212 was in a reclined position prior to a vehicular collision, the system 202 may calculate a higher score of vehicle ejection for individual 212. In another example, if the system 202 determines that the individual 210 was sitting in an upright manner while restrained by a seatbelt, the system 202 may calculate a lower score of vehicle ejection for individual 210. According to the third set of rules, the one or more computing devices of may calculate an occupant posture score.

The vehicle momentum score, the vehicle glass damage score, and the occupant posture score may be aggregated and/or combined in any suitable manner, such as by adding the scores, multiplying the scores, averaging the scores, assigning a weight to each score and adding or multiplying the weighted scores, taking a weighted average of the scores, etc. In any event, the scores may be combined/aggregated to determine a probability of vehicle ejection of one or more occupants. For example, the system 202 may determine a probability of vehicle ejection score of 100, based upon 100 percent of the sensor data sets having scores of 100 that correspond to a vehicle ejection.

Further, the system 202 may be configured to provide an output signal that includes the probability of vehicle ejection to one or more emergency responders. The output signal may include the determined probability of vehicle ejection score. In another example, the output signal may be provided as an audio signal that corresponds to the probability of vehicle ejection.

In some embodiments, the captured 2-D and/or 3-D image data may also be used to determine a likelihood of effectiveness of seatbelt restraint based on the posture of the individual 212. As shown in FIG. 2, the individual 212 may be in a reclined position that reduces the effectiveness of seatbelt 214. In the event of a crash, the system 202 may adjust the probability of vehicle ejection of individual 212 based on a determined likelihood of effectiveness of the seatbelt 214. For example, the posture of the individual 212 may reduce the effectiveness of the seatbelt 214 by a given percentage. In this example, the system 202 may increase the probability of vehicle ejection because the individual 212 was in a reclined position while wearing the seatbelt 214.

Figure 3:
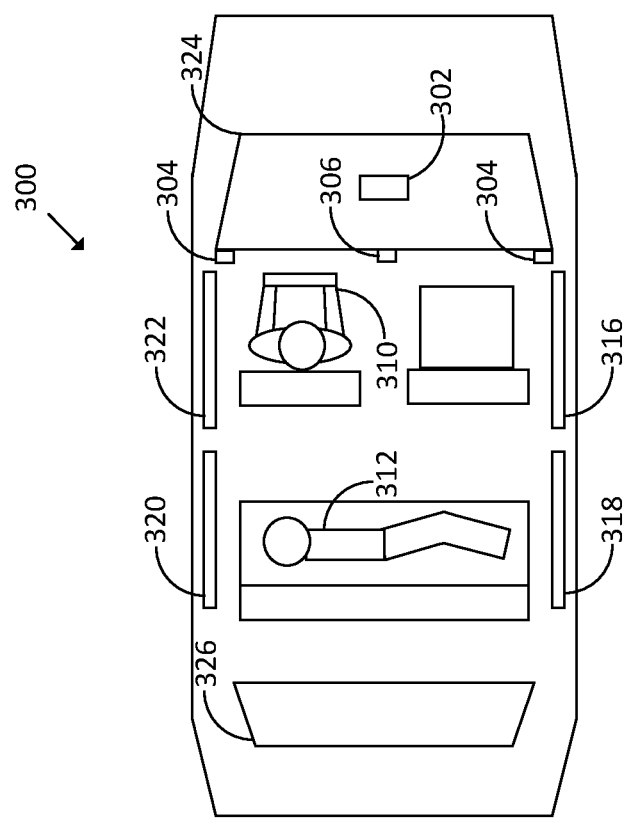
FIG. 3 depicts another example top view of a vehicle, in accordance with some embodiments.

FIG. 3 illustrates an example depiction of a top view of vehicle 300 that may include various components associated with the systems and methods. The vehicle 300 includes system 302 and a set of image sensors 304, 306, and 308. FIG. 3 also includes an individual 310 operating the vehicle 300 and an individual 312 in a recumbent position.

The system 302 is configured to operate in a similar manner to system 202 as discussed above in connection with FIG. 2. The image sensors 304, 306, and 308 are also configured to operate in a similar manner to the image sensors 204, 206, and 208 as discussed above in connection with FIG. 2 and the image sensors 105, 106, and 107 as discussed above in connection with FIG. 1. Operation of the system 302 will now be described in connection with an example scenario depicted in FIG. 4.

Figure 4:
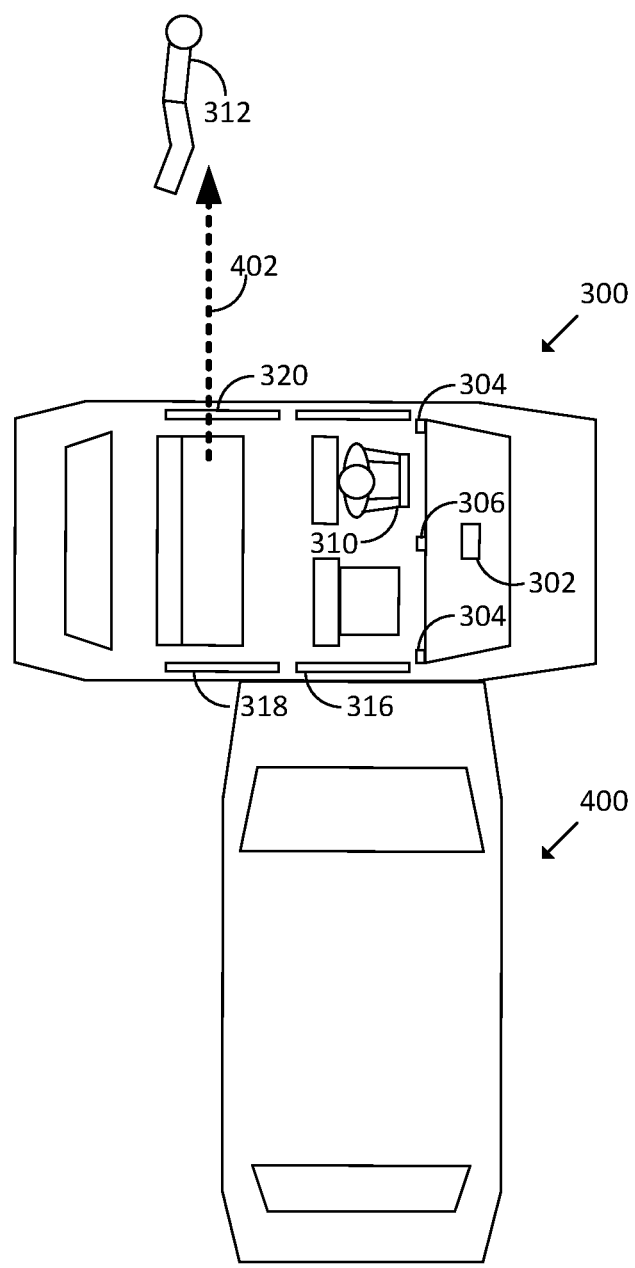
FIG. 4 depicts an example scenario involving a vehicular collision, in accordance with some embodiments.

FIG. 4 illustrates an example scenario involving a collision between vehicle 300 of FIG. 3 and vehicle 400. Prior to this example scenario, as shown in FIG. 3, individual 312 was in a recumbent position in the back seat of vehicle 300. As shown in FIG. 4, individual 312 is depicted outside of vehicle 300 due to the collision between vehicles 300 and 400.

In the example scenario, system 302 may determine that the probability of vehicle ejection on individual 312 is high based on the change in momentum resulting from the collision of vehicle 300 and vehicle 400, the damage to vehicle window 320, and the posture of the individual 312 (as shown in FIG. 3). The system 302 may determine that the probability of vehicle ejection exceeds a threshold and be further configured to determine a location of the individual 312. In this scenario, the system 302 may be configured to determine a trajectory 402 of the individual 312 based on the change in momentum of vehicle 300. Based on the trajectory 402, the system 302 may determine the location of the individual 312 subsequent to the collision between vehicles 300 and 400. For example, the system 302 may apply the trajectory 402 to GPS data obtained from a location module of the vehicle 300 in order to determine the location of the individual 312 outside of the vehicle 300. Further, the system 302 may provide a visual notification that includes the location of the individual 312 to one or more emergency responders. In one example, the system 302 may include the GPS data associated with the determined location of the individual 312 with the visual notification. In another example, the visual notification may include a radial distance of the individual 312 from the vehicle 300 based on the trajectory 402.

In one scenario, the individual 312 may have been ejected from the vehicle 300 while carrying a mobile device (e.g., the electronic device 115 of FIG. 1B). In this scenario, the system 302 may receive GPS data from the mobile device associated with the individual 312 and update the location of the individual 312. Further, the system 302 may provide the updated location of the individual 312 based on the received GPS data from the mobile device.

In this example scenario depicted in FIG. 4, the system 302 may determine the probability of vehicle ejection by determining one or more locations corresponding to damage to one or more glass panes. For example, the system 302 may determine that vehicle windows 316, 318, and 320 have been damaged as a result of the collision. The system 302 may determine that based on the relative location of the individual 312 to the damaged vehicle windows 316, 318, and 320, that the individual 312 would be at a higher risk of vehicle ejection. Further, based on the determined relative location of individual 312, the system 302 may modify the determined probability of vehicle ejection.

Figure 5:
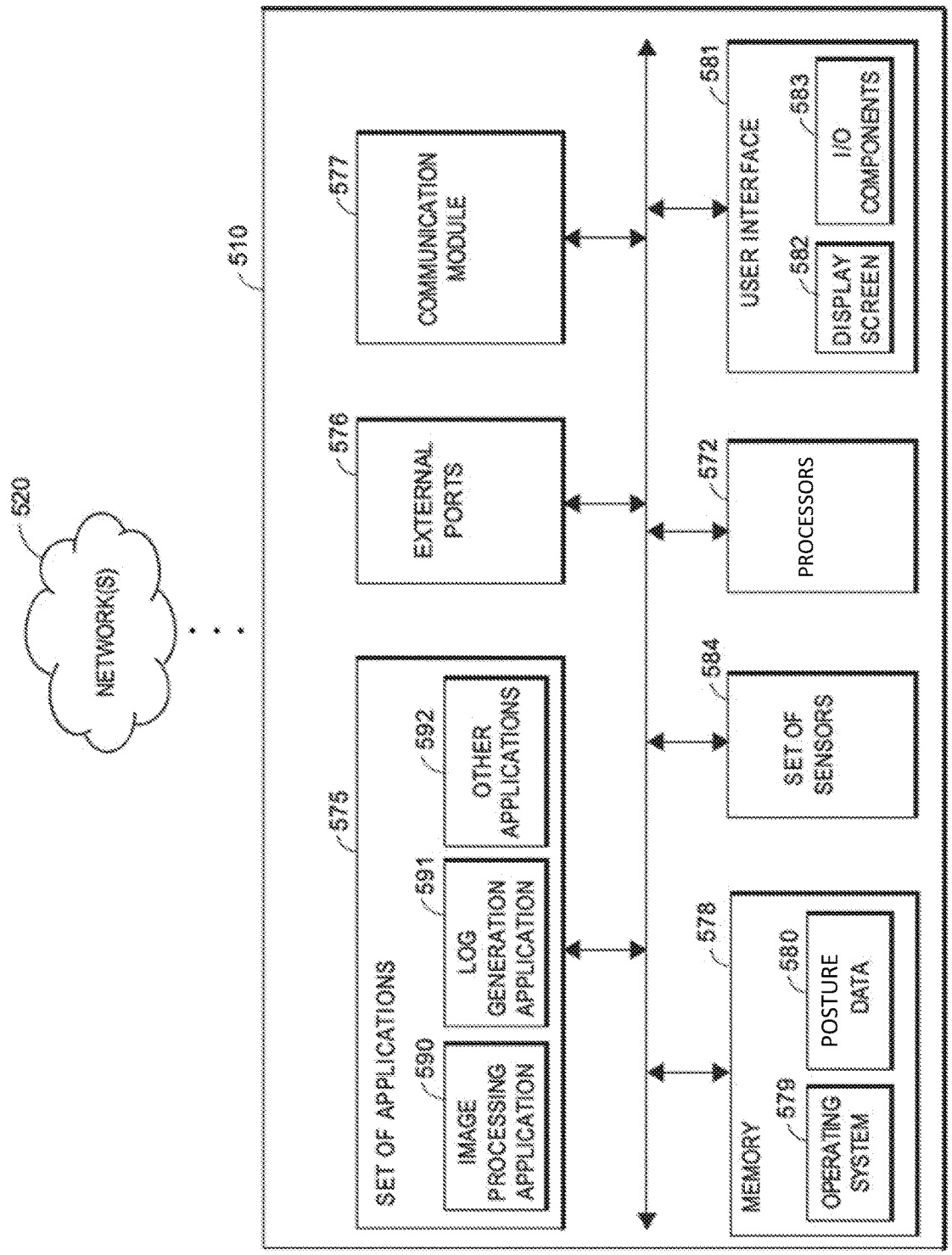
FIG. 5 is a block diagram of an exemplary system for providing vehicle ejection information, in accordance with some embodiments.

FIG. 5 illustrates a diagram of an exemplary system 510 (such as the system 110 of FIG. 1, the system 202 of FIG. 2, the system 302 of FIG. 3) in which the functionalities as discussed herein may be implemented. It should be appreciated that the system 510 may be configured to be transported in a vehicle and/or connect to an on-board telematics platform of the vehicle, as discussed herein. Further, it should be appreciated that the system 510 may be integrated into an on-board system of the vehicle.

The system 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify the positions and/or postures of individuals depicted in the image data, and a log generation application 591 configured to interface with sensors and generate vehicle operation logs that may include various vehicle operation parameters. It should be appreciated that one or more other applications 592 are envisioned, such as an application configured to interface wirelessly with one or more electronic devices (e.g., the electronic device 115 of FIG. 1).

The processor 522 may interface with the memory 578 to execute the operating system 579 and the set of applications 575. According to some embodiments, the memory 578 may also include a library of posture data 580. In some implementations, the image processing application 590 may interface with the posture data 580 to retrieve posture data and analyze the captured 2-D and/or 3-D image data with the posture data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The system 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, a library of posture data from a remote server. For further example, the communication module 577 may transmit data to and receive data from a remote server via the network 520.

The system 510 may further include a set of sensors 584 (e.g., image sensors 105, 106, and 107 of FIG. 1, image sensors 204, 206, and 208 of FIG. 2, image sensors 304, 306, and 308 of FIG. 3). The processor 522 and the set of applications 575 may interface with the set of sensors 584 to retrieve and process the corresponding sensor data. The set of sensors 584 may include, for example, a location module, an accelerometer, a gyroscope, a compass, a weather sensor, one or more image sensors, various biometric sensors capable of sensing various biometric data as discussed herein, and/or the like. In one particular implementation, the log generation application 591 may use various data from the set of sensors 584 to generate vehicle operation logs.

The system 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the system 510 via the user interface 581 to review information and/or perform other functions. In some embodiments, the system 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable medium (e.g., standard random access memory (RAM), an optical disc, a universal serial bus (USB) drive, or the like) having computer-readable program code embodied therein, wherein the computer-readable program code may be adapted to be executed by the processor(s) 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, ActionScript, Objective-C, JavaScript, CSS, XML). In some embodiments, the computer program product may be part of a cloud network of resources.

Figure 6:
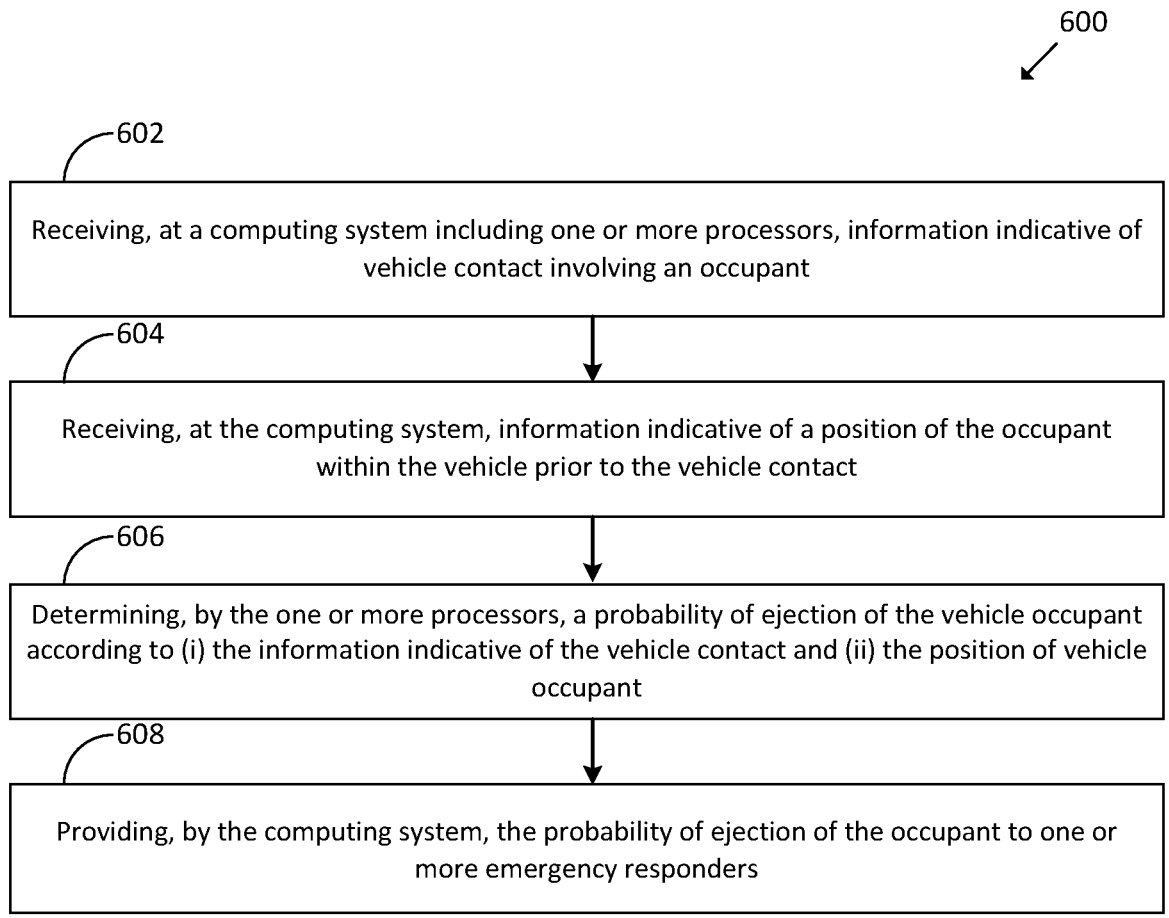
FIG. 6 depicts an example method for providing a probability of vehicle ejection, according to an embodiment of the present disclosure.
Figure 7:
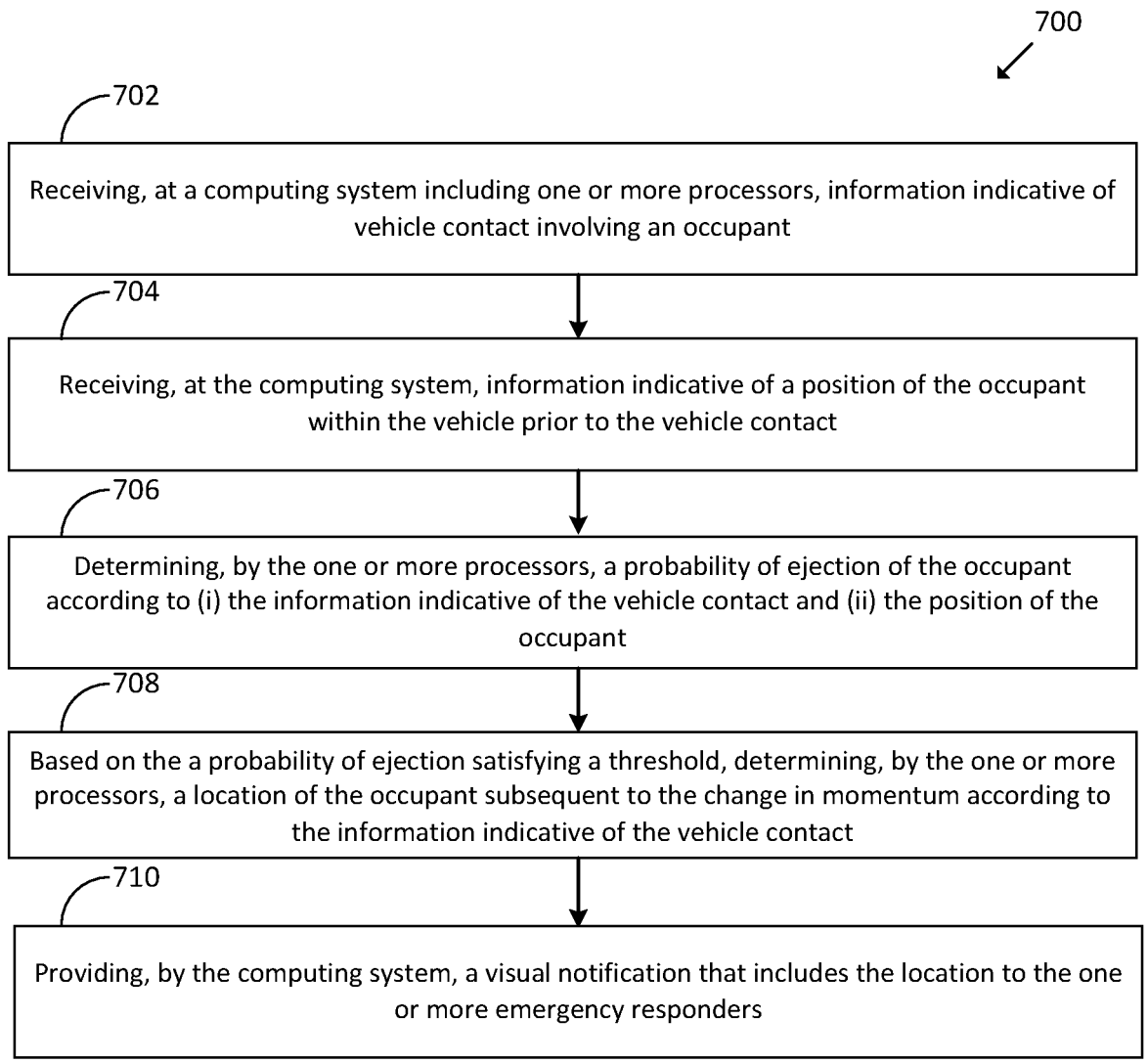
FIG. 7 depicts an example method for providing a visual notification of vehicle ejection, according to an embodiment of the present disclosure.

FIGS. 6 and 7 are flow diagrams of example methods for providing vehicle ejection information to one or more emergency responders, in accordance with at least some of the embodiments described herein. Although the blocks in each figure are illustrated in a sequential order, the blocks may in some instance be performed in parallel, and/or in a different order than those described therein. Also, the various blocks may be combined into fewer blocks, divided into additional blocks, and/or removed based upon the desired implementation.

In addition, the flow diagrams of FIGS. 6 and 7 each show the functionality and operation of one implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 6 or 7 may represent circuitry that is wired to perform the specific logical functions in the process. Illustrative methods, such as those shown in FIGS. 6 and 7, may be carried out in whole or in part by a component or components in the cloud and/or system. However, it should be understood that the example methods may instead be carried out by other entities or combinations of entities (i.e., by other computing devices and/or combinations of computing devices), without departing from the scope of the invention. For example, functions of the method of FIG. 6 or 7 may be fully performed by a computing device (or components of a computing device such as one or more processors), or may be distributed across multiple components of the computing device, across multiple computing devices, and/or across a server.

Referring first to FIG. 6, the example method 600 may include one or more operations, functions, or actions as illustrated by blocks 602-608. In one embodiment, the method 600 is implemented in whole or in part by the system 110 of FIG. 1 (or one or more processors thereof), the system 202 of FIG. 2 (or one or more processors thereof), the system 302 of FIG. 3, or the system 510 of FIG. 5.

The method 600 includes receiving, at a computing system including one or more processors, information indicative of a vehicle crash (or "vehicle contact") involving a vehicle occupant (block 602). In one example, the information indicative of the vehicle crash may include sensor data from one or more sensors such as a location module, an accelerometer, an ignition sensor, a clock, speedometer, a torque sensor, a throttle position sensor, a compass, a yaw rate sensor, a tilt sensor, a steering angle sensor, a brake sensor, and/or other sensors. In one example, the computing system may be located remotely and configured to receive the information indicative of the vehicle crash.

The method 600 also includes receiving, at the computing system, information indicative of a position of the vehicle occupant within the vehicle prior to the vehicle crash (block 604). For example, the information indicative of the position of the vehicle occupant may include a position of the vehicle occupant that could be more susceptible to vehicle ejection (e.g., the vehicle occupant located in an aisle of a minivan or the cargo area of a sport utility vehicle prior to a collision).

The method 600 may also include determining, by the one or more processors, a probability of ejection of the vehicle occupant according to (i) the information indicative of the vehicle crash and (ii) the position of vehicle occupant (block 606). In some embodiments, the one or more processors may analyze sensor data pertaining to the vehicle crash and the position of the vehicle occupant in order to determine the probability of ejection. For example, the one or more processors may determine that the probability of ejection is "high" based on GPS data indicative that the vehicle has rolled over and the position of the vehicle occupant indicating improper seatbelt restraint prior to the crash.

In one embodiment, based on the information indicative of the vehicle crash, the one or more processors may determine one or more locations corresponding to the damage to the one or more glass panes of the vehicle. In this embodiment, the one or more processors may determine a relative location of the vehicle occupant based on the one or more locations corresponding to the damage to the one or more glass panes. Further, based on the relative location of the vehicle occupant, the one or more processors may modify the determined probability of ejection of the vehicle occupant. For example, the one or more processors may reduce the determined probability of ejection based on damage to only the rear windshield of the vehicle while the vehicle occupant was driving the vehicle.

In another embodiment, the computing system may further determine the probability of ejection according to received information indicative of seatbelt restraint associated with the occupant prior to the vehicle crash. In this embodiment, the one or more processors may determine a likelihood of effectiveness of the seatbelt restraint based on the posture of the occupant. Further, based on the likelihood of effectiveness, the one or more processors may modify the determined probability of vehicle ejection. In one example, the one or more processors may determine that based on the posture the vehicle occupant, the shoulder harness or "sash" of the seatbelt was not effectively restraining the vehicle occupant. In this example, the one or more processors may increase the probability of ejection based on a lower likelihood of effectiveness of the seatbelt restraint.

In another embodiment, the computing system may further determine the probability of ejection by comparing the posture of the occupant to one or more postures associated with a predetermined likelihood of vehicle ejection. Based on a match of the posture of the occupant to at least one of the one or more postures, the computing system may increase the probability of vehicle ejection. For example, the one or more postures associated with the predetermined likelihood of vehicle ejection may include one or more recumbent positions within the vehicle.

In another embodiment, the one or more processors may further determine the probability of vehicle ejection based on a determination of one or more forces associated with the vehicle crash. The one or more processors may be configured to determine whether the one or more forces exceed a threshold associated with a predetermined likelihood of vehicle ejection. Further, based on a determination that the one or more forces exceed the threshold, the computing system may increase the probability of vehicle ejection. In one example, the one or more processors may be configured to distinguish sensor data indicative of a vehicle collision (e.g., a threshold acceleration (measured in g-forces) above thirty G may indicate a high likelihood of vehicle ejection) and sensor data which does not indicate a vehicle collision.

The method 600 may also include providing, by the computing system, the probability of ejection of the vehicle occupant to one or more emergency responders (block 608). In one example, the computing system may use any suitable wireless communication protocol network, such as wireless telephony network (e.g., GSM, CDMA, LTE, etc.), a Wi-Fi network (802.11 standards), a WiMAX network, a Bluetooth network, etc. In one example, the probability of ejection of the vehicle occupant may be stored in a central database that is accessible by the one or more emergency responders.

In some embodiments, the method 600 includes one or more additional blocks not shown in FIG. 6. For example, the method 600 may also include based on the probability of vehicle ejection exceeding a threshold, determining, by the one or more processors, a trajectory of the occupant based on the vehicle crash. In this example, the method 600 may also include based on the trajectory, determining, by the one or more processors, a location of the occupant subsequent to the vehicle crash. Further, the method 600 may also include providing, by the computing system, a visual notification that includes the location to the one or more emergency responders.

In one embodiment, the method 600 may also include receiving, at the computing system, information indicative of a location of a mobile device associated with the vehicle occupant. In this embodiment, the method 600 may also include updating, by the computing system, the location of the occupant according to the location of the mobile device. For example, the mobile device may be configured to communicate with the computing system upon detection of crash event (e.g., by measuring one or more sudden changes to acceleration, roll, pitch, yaw, etc.). In this example, the mobile device may be configured to transmit GPS data of the mobile device to the computing system subsequent to the detection of the crash event.

In some embodiments, the method 600 may include determining a change in momentum of the vehicle (and/or the vehicle occupant). Change in momentum may be determined, for example, based upon accelerometer data, speedometer data, known or estimated mass of the vehicle, or other factors as described in this detailed description. In some embodiments, the method 600 may include determining, based at least in part upon a determined change in momentum of the vehicle, a probability of ejection of the vehicle occupant, an ejection trajectory of an ejected vehicle occupant, and/or a location of an ejected vehicle occupant.

Referring next to FIG. 7, the example method 700 may include one or more operations, functions, or actions as illustrated by blocks 702-710. In one embodiment, the method 700 is implemented in whole or in part by the system 110 of FIG. 1 (or one or more processors thereof), the system 202 of FIG. 2 (or one or more processors thereof), the system 302 of FIG. 3 (or one or more processors thereof), or the system 510 of FIG. 5 (or one or more processors thereof).

The method 700 includes receiving, at a computing system including one or more processors, information indicative of a vehicle crash (or "vehicle contact") involving a vehicle occupant (block 702). Block 702 may be similar in functionality to block 602 of method 600.

The method 700 may also include receiving, at the computing system, information indicative of a position of the vehicle occupant within the vehicle prior to the vehicle crash (block 704). Block 704 may be similar in functionality to block 604 of method 600.

After receiving the above information, the method 700 may then determine, by the one or more processors, a probability of ejection of the vehicle occupant according to (i) the information indicative of the vehicle crash and (ii) the position of vehicle occupant (block 706). Block 706 may be similar in functionality to block 606 of method 600.

The method 700 may also include based on the a probability of ejection satisfying a threshold, determining, by the one or more processors, a location of the occupant subsequent to the change in momentum according to the information indicative of the vehicle crash (block 708). In one embodiment, determining the location of the occupant may further include receiving information indicative of a location of a mobile device associated with the vehicle occupant. In this embodiment, the computing system may be configured to update the location of the occupant according to the location of the mobile device. In one scenario, the mobile device may detect movement (e.g., an individual ejected from the vehicle slowly moving a limb) subsequent to a period of no movement. In this scenario, based on detection of the movement, the mobile device may be configured to transmit GPS data to the computing system.

The method 700 may also include providing, by the computing system, a visual notification that includes the location to the one or more emergency responders (block 710). Block 710 may be similar in functionality to block 608 of method 600.

In some embodiments, the method 700 may include determining a change in momentum of the vehicle (and/or the vehicle occupant). Change in momentum may be determined, for example, based upon accelerometer data, speedometer data, known or estimated mass of the vehicle, or other factors as described in this detailed description. In some embodiments, the method 600 may include determining, based at least in part upon a determined change in momentum of the vehicle, a probability of ejection of the vehicle occupant, an ejection trajectory of an ejected vehicle occupant, and/or a location of an ejected vehicle occupant.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor–implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement in computer functionality, and improve the functioning of conventional computers.

What is claimed is:

1. A computer-implemented method comprising:
   detecting, via one or more image sensors, a position of an occupant within a vehicle;
   sending information indicative of the position of the occupant in real-time to a computing system;
   receiving, at the computing system including one or more processors, via the one or more computing devices disposed at the vehicle, the real-time information indicative of the position of the occupant within the vehicle;
   receiving, at the computing system, information indicative of vehicle contact involving the occupant within the vehicle;
   in response to receiving the information indicative of vehicle contact, determining, by the one or more processors based upon the received information indicative of the position of the occupant, the position of the occupant within the vehicle prior to the vehicle contact;
   determining, by the one or more processors, whether one or more conditions corresponding to an increased likelihood of ejection of the occupant are present, the determination being based upon at least (i) the information indicative of the vehicle contact and (ii) the position of the occupant prior to the vehicle contact; and
   transmitting, by the computing system, to one or more computing devices associated with emergency responders, an indication of whether the one or more conditions corresponding to increased likelihood of ejection of the occupant are present, the transmitting of the indication causing the indication to be displayed at the one or more computing devices associated with emergency responders.

2. The computer-implemented method of claim 1, wherein determining whether the one or more conditions corresponding to increased likelihood of ejection are present further includes:
   determining, by the one or more processors, one or more locations corresponding to damage to one or more glass panes of the vehicle;
   determining, by the one or more processors, a relative location of the occupant based on the one or more locations corresponding to the damage to the one or more glass panes; and
   determining, by the one or more processors, the increased likelihood of ejection based in part upon the relative location of the occupant.

3. The computer-implemented method of claim 1, wherein determining whether the one or more conditions corresponding to increased likelihood of ejection are present further includes:
   receiving, at the computing system, information indicative of seatbelt restraint associated with the occupant prior to the vehicle contact;
   determining, by the one or more processors, a likelihood of effectiveness of the seatbelt restraint based on a posture of the occupant; and
   determining, by the one or more processors, the increased likelihood of ejection based in part upon the likelihood of effectiveness of the seatbelt.

4. The computer-implemented method of claim 1, further comprising:
   determining, by the one or more processors, a trajectory of the occupant based on a change of momentum associated with the vehicle contact;
   based on the trajectory, determining, by the one or more processors, a location of the occupant subsequent to the change in momentum; and
   providing, by the computing system, a visual notification that includes the location to the one or more computing devices associated with the emergency responders.

5. The computer-implemented method of claim 4, wherein determining the location of the occupant further includes:
   receiving, at the computing system, information indicative of a location of a mobile device associated with the occupant; and
   updating, by the computing system, the location of the occupant according to the location of the mobile device.

6. The computer-implemented method of claim 1, wherein determining whether the one or more conditions corresponding to increased likelihood of ejection are present further includes:
   comparing, by the computing system, a posture of the occupant to one or more postures associated with a predetermined likelihood of vehicle ejection; and
   determining the increased likelihood of ejection based at least in part on a match of the posture of the occupant to at least one of the one or more postures.

7. The computer-implemented method of claim 6, wherein the one or more postures one or more recumbent positions within the vehicle that are associated with the increased likelihood of ejection.

8. The computer-implemented method of claim 1, wherein determining whether the one or more conditions corresponding to increased likelihood of ejection are present further includes:
- determining, by the one or more processors, one or more forces associated with the vehicle contact;
- determining, by the one or more processors, whether the one or more forces exceeds a threshold, wherein the threshold is associated with the increased likelihood of vehicle; and
- determining the increased likelihood of ejection based in part upon the one or more forces exceeding the threshold.

\* \* \* \* \*